Figure 1:
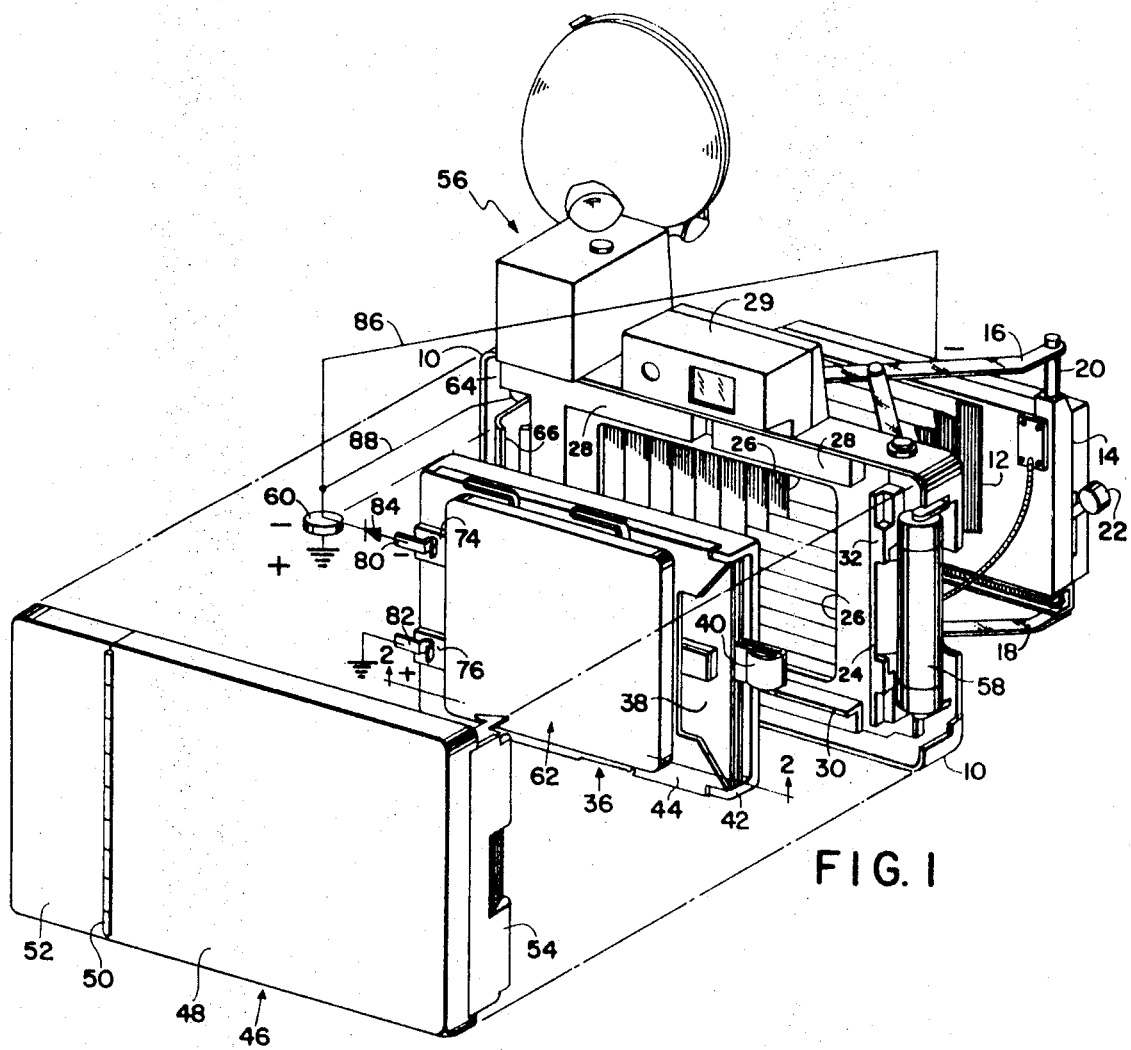

United States Patent

[11] 3,587,425

| [72] | Inventor | Conrad H. Biber<br>Needham, Mass. |
|---|---|---|
| [21] | Appl. No. | 886,126 |
| [22] | Filed | Dec. 18, 1969 |
| [45] | Patented | June 28, 1971 |
| [73] | Assignee | Polaroid Corporation<br>Cambridge, Mass. |

[54] POWER SUPPLY FOR A PHOTOGRAPHIC CAMERA
20 Claims, 2 Drawing Figs.

[52] U.S. Cl.......................................... 95/11,
95/31, 95/53
[51] Int. Cl........................................... G03b 37/02
[50] Field of Search........................................ 95/11, 31,
53

[56] References Cited
UNITED STATES PATENTS
2,989,906  6/1961  Rentschler .................. 95/11

| 3,321,690 | 5/1967 | McCarthy et al. ............ | 320/6 |
| 3,481,261 | 12/1969 | Fisher et al. .................. | 95/31 |
| 3,485,152 | 12/1969 | Fuwa............................ | 95/11.5(X) |

FOREIGN PATENTS
199,491  9/1958  Australia..................... 95/31

Primary Examiner—Samuel S. Matthews
Assistant Examiner—Robert P. Greiner
Attorneys—Brown and Mikulka and Gerald L. Smith ABSTRACT: An electrical power supply for a photographic camera and its accessories. Current demands of the photographic system are met by a secondary cell mounted within the basic camera structure. The secondary cell is rechargeable during a picture taking sequence by a primary battery incorporated with a disposable film cassette. Following the exhaustion of film within the cassette, both the empty cassette and the primary recharging battery are disposed of. A diode or the like is inserted within the interconnecting circuitry of the batteries in order to prevent a backdrain of charge from the secondary battery.

PATENTED JUN 28 1971

3,587,425

INVENTOR
CONRAD H. BIBER

BY Brown and Mikulka
and
Gerald L. Smith
ATTORNEYS

POWER SUPPLY FOR A PHOTOGRAPHIC CAMERA

CROSS-REFERENCE TO RELATED APPLICATION

The present application is a continuation-in-part of a copending U.S. application for Pat., Ser. No. 702,450, entitled "Power Supply For a Photographic Camera," filed Feb. 1, 1968, now abandoned, by the present inventor.

The present invention relates to electrical power supply systems for photographic cameras, and more specifically, to a photographic camera arrangement having a secondary battery power supply adapted to be recharged by a primary battery source incorporated within a disposable film retaining cassette.

BACKGROUND OF THE INVENTION

The manufacturers of photographic cameras continually have sought to improve and simplify the procedures and techniques for exposing film. Considerable effort has been expended by the industry in an endeavor to automate the separate function requisite to preparing a camera for making an exposure. By replacing the manually adjustable mechanism of a camera with automating systems, there is assured a desirably higher picture taking success rate. Typifying the innovations which have been incorporated within camera structures are automatic exposure control systems, flash or strobe illumination devices, film transport mechanisms operable in conjunction with the exposure devices and systems for processing exposed film frames within the body of a camera itself.

For the most part, each of these innovations imposes a need for a supply of electrical power. For instance, an automatic exposure control system typically may require a source of energy capable of delivering a current in the order of about 50 milliamperes for up to several seconds at approximately 2.6 volts. A strobe illumination system may typically demand approximately 8 amperes for 10 to 15 seconds at about 2.6 volts, or, alternately, the ignition of flashbulbs will generally require about 1 ampere at 2.6 volts for 5 milliseconds. Film transport systems for moving unexposed film frames into position for exposure and/or providing a film processing function may require about 3 amperes peak current for around 50 milliseconds, and a continued 2 amperes for up to 1 second at approximately 5 volts.

To meet such power demands as have been enumerated above, the power supply for a camera must provide a reliable and consistent level of current output or capacity. The power supply must further be capable of holding up under a broad range of environments. In particular, an energy source such as a battery should enjoy a lengthy shelf life under wide temperature variances. Modern camera design trends further impose the criteria that sources such as batteries be of small, compact size for incorporation within camera housings. The battery source should additionally meet human factor design demands inasmuch as their renewal or servicing may be neglected by the consumer public. Accordingly, a battery incorporated within a camera housing desirably should be capable of reliable operation over an unattended period of several years. Two battery power sources, primary and secondary, are used predominantly by industry, however, each in one aspect or another, fails to meet all of the above outlined performance criteria.

The primary battery, generally considered as one which cannot be recharged efficiently or safely after any amount of discharge, is popularly regarded for its relatively low cost. Unfortunately, however, the batteries are characterized in having inherently poor charge retention characteristics. This marginal ability to sustain initially adequate energy levels becomes especially apparent in situations where the batteries are subjected to moderately high temperature conditions. Under environmental temperatures about 80° to 90° F., their rate of energy dissipation becomes pronounced. The efficiencies of the batteries are further dependent upon the form of service demands imposed upon them. Their service capacities will vary in accordance with operating schedules and corresponding current drain rates as well as with the environments under which they are stored prior to use. To assure its effective operation, the primary battery must be replaced not only periodically, but also in accordance with the frequency, environment and degree of its use. Failure to replace the exhausted cells may lead to chemical deterioration, thereby jeopardizing camera housings. Where lengthy unattended service is contemplated, as in the case with the design trends of the photographic industry, primary batteries are of only borderline value.

Secondary batteries are those which are considered capable of being recharged. These cells, typical of which is the nickel-cadmium variety, are formed of a combination of active materials which can be electrolytically oxidized and reduced repeatedly. The oxidation of the negative electrode occurring simultaneously with the reduction of the positive generates electric power. Both electrode reactions are reversible and the input of current in the proper direction from an outside source will drive the reaction backwards to effect an electrode recharge. Secondary batteries are advantageously characterized in enjoying a relatively long service life and in having relatively high current drain capacities. However, by virtue of the size limitations imposed by camera structures, their current drain capacities are available for only an inadequately short interval of time. The cells may be recharged following these short intervals, however, by interposing this requirement there is reintroduced the necessity for accommodating the human factor. Failure to rigorously perform a periodic recharging function will lead to possible cell damage and aborted film exposures.

SUMMARY OF THE INVENTION

The inventive photographic camera arrangement now presented incorporates a rechargeable or secondary battery within the camera structure for powering its exposure functions. Adequate energy levels are maintained within the storage cell by virtue of its intermittent recharging connection with a primary battery. The primary battery of the power system is fabricated for attachment with a disposable film cassette.

Inasmuch as the film supply for the camera is periodically replaced, the primary energy source is also replenished following a nominal number of film exposing and power consuming cycles. As a consequence, the secondary source is made capable of accommodating the current drains imposed by photographic accessories over the limited period during which the film supply is consumed. Further in the latter regard, an advantageous, continuous charging is imposed upon the secondary battery throughout the period of utilization of the film supply, thereby maintaining its stored capacity at maximized energy levels. As a result, the reliability of the camera power system is optimized.

The incorporation of a secondary battery within the camera housing in operative association with a recharging primary battery within a disposable film cassette results in an optimization of the distinct advantageous characteristics of both energy generators. More particularly, the desirably lengthy life span of the secondary battery complements a need for inserting within a camera a power supply capable of long term unattended performance. The characteristic ability of such storage cells to perform efficiently under broader environmental temperature ranges further enhances the trouble-free performance of automated camera exposure systems. As a result of its recharging relationship with a disposable primary cell, the secondary battery may be selected of advantageously small dimension for facile mounting within a broadened variety of camera structures.

Inasmuch as the primary battery of the inventive power system arrangement is mounted upon a disposable film cassette, it may share the environmental protection normally afforded packaged film. Consequently, until it is utilized within a camera in a recharging function, the primary battery will be stored under optimum energy conserving conditions. For instance, cassettes containing unexposed film are generally warehoused at controlled lower temperatures and within sealed containers. Additionally, unexposed film storage procedures include more or less rigidly administered dating techniques established in correspondence with the relatively short shelf lives of the product. The storage requisites for primary batteries ideally correspond with these conditions. Charge retention is maximized at lower storage temperatures. Chemical decomposition is minimized within a low temperature protective environment. Further, the restricted storage periods fall in correspondence with the limited shelf life of the primary cells. As a consequence, the cells are made available for use while uniformly retaining a substantial portion of their original energy content.

It is an additional object of the present invention to provide a camera arrangement having a power system adapted to utilize a disposable film cassette within which is incorporated an expendable primary battery. By virtue of primary cell disposal following the limited period of time during which the film supply of the cassette is exhausted, the opportunity for camera structure damage caused by battery degeneration and chemical breakdown is minimized.

Another object of the invention is to provide a photographic camera assembly having a power source comprising a secondary battery having terminals for recharging disposed within a camera housing in combination with a disposable film retaining cassette within which is incorporated a flat primary battery adapted to effect secondary cell recharging through the aforesaid terminals.

Other objects of the invention will in part be obvious and will in part appear hereinafter.

The invention accordingly comprises the system and apparatus possessing the construction, combination of elements and arrangement of parts which are exemplified in the following detailed disclosure.

Figure 2:
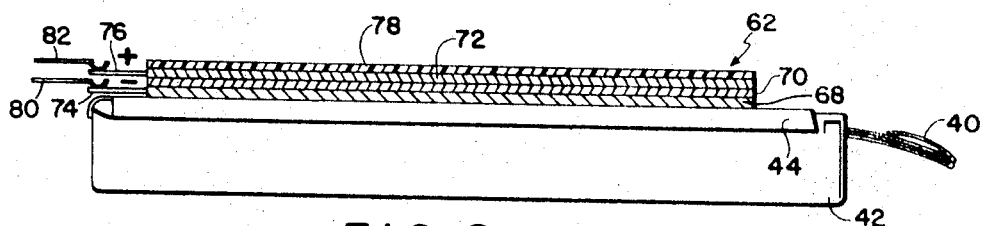

For a fuller understanding of the nature and objects of the invention, reference should be had to the following detailed description taken in connection with the accompanying drawing wherein:

FIG. 1 is a perspective view of a camera incorporating the power system of the invention, showing in partially exploded and partially schematic fashion components of the photographic arrangement; and FIG. 2 is a side view of a film cassette showing a primary battery arrangement of the invention as a partial segment through the line 2–2 of FIG. 1.

The power system of the invention will be found to be capable of incorporation within a wide variety of photographic camera structures. For purposes of illustration, the powering arrangement is described in connection with a camera configuration which will be recognized as one of a variety incorporating functions for internally processing exposed film frames.

Referring to FIG. 1, the camera structure is illustrated having a main body housing 10. Extending forwardly from the central portion of the housing 10 is a flexible retractable bellows 12. The outwardly extending periphery of bellows 12 is, in turn, connected to a shutter housing and lens board 14. Lens board 14 is manually erected and manipulated in focusing positions appropriate for film exposure through the media of duplicate dual armed linkages 16 and 18. Linkage 16 is pictured in pivotal connection with housing 14 at a pivot post 20 projecting from the camera front. Extending from the shutter housing 14 there is also shown a shutter cocking lever 22. A conventional rangefinder-viewfinder 29 is shown in position at the top of the housing 10.

Looking into the rearward portion of the main body housing 10, the camera is configured to form a receiving chamber for positioning film before the lens system. The chamber includes a forward surface 24 within which is formed a film frame aperture, the periphery of which is indicated at 26. It will be apparent that the receiving chamber serves to removably retain frames of film in position for exposure. In the instant embodiment, the chamber is adapted to receive a rectangularly-shaped film packet or cassette. To appropriately retain such a structure in position against the surface 24, guide members as at 28, 30, and 32 are affixed about the periphery of the chamber to form an inset.

A film retaining packet or cassette shown generally at 36 is configured for positioning within the above described receiving chamber. The term "cassette" as used herein, is intended to include any film retaining device for insertion in cameras. Cassette 36 is structured to hold a series of film frames 38 in position for sequential exposure at the aperture 26. In the illustrated embodiment, the film frames are sequentially positioned within the cassette by selectively transporting outward a series of guide or lead tabs, certain of which are indicated at 40. Film cassettes such as that depicted at 36 are fabricated inexpensively so that they may be discarded following the exhaustion of the film stored within them. Accordingly, the devices are usually fashioned from simple moldings and stampings. The cassette illustrated at 36 is shown to include a plastic tray member 42 to which is connected a back plate 44.

To complete the basic camera structure, a back portion generally depicted at 46 is positioned over the rearward end of the housing 10. Back portion 46 includes a main access door 48 which is generally pivotally attached to the housing 10 at hinge 50. Additionally connected to the housing at hinge 50 is a battery compartment access door 52. From main access door 48 there is hinged a flap-shaped port 54 which serves to assure the lighttight integrity of the receiving chamber, while also permitting the egress of exposed, processed film frames. Generally, the flat member 54 is biased in a closed position by a spring means not shown. The back portion 46 also functions to receive internal film processing implements. Typically, these elements are designed as rollers or similar film sheet compressing devices through which the exposed film is directed as it egresses through port 54. The basic functioning of such film processing system is well known in the art.

Turning now to the operational functions of the basic camera arrangement, three somewhat typical power consuming implements are generally depicted in connection with the camera structure. These include: an electronically actuated shutter within the housing 14, a flash or strobe unit 56, and a film transport motor 58. Each of the implements will impose, either singly, or in combination, varying energy demands upon the power system of the camera. For instance, the electronic shutter may require delivery of a current of about 50 milliamperes at approximately 2.6 volts. Should the illuminator 56 be a strobe-light, it may demand about 8 amperes at approximately 2.6 volts. As a typical flash bulb unit, the illuminator 56 would necessitate about 1 ampere at 2.6 volts. In the interest of clarity, the automated film transport system of the camera has been illustrated in a manner showing only the motor 58 of the system. Such motors typically will demand about 3 amperes peak current and 2 amperes sustained current at approximately 5 volts.

The power system of the invention uniquely meets the above demands while enjoying adequately low weight and bulk for ready incorporation within a conventional camera structure such as that illustrated. The power system is formed of two energy storage components which are arranged cooperatively to derive requisite energy densities. Energy for meeting any one or all of the above-outlined implement loads is supplied by a rechargeable secondary battery as illustrated at 60. This battery, in turn, is uniquely recharged by a primary battery as at 62 situated upon the back plate of film cassette 36.

Looking more particularly to the status of secondary battery 60 in the photographic power system, the unit 60 is pictured having a button-shaped housing. The capacity or output capability required of the unit is predetermined in accordance with the power loads to be encountered with a given camera configuration over a select number of exposure cycles. A number of buttons or cells is then assembled in series to provide this capacity. The minimum number of exposure cycles over which power must be supplied by the unit 60 is selected to correspond with the number of film frames available in one disposable cassette 36. In this regard, 6 to 10 cycles generally will be required of a nominally charged power unit.

A broad variety of rechargeable secondary batteries adequate for use as unit 60 are available to industry. For example, nickel-cadmium cells are capable of delivering high current drain, have a life-expectancy of several hundred recharge cycles and a 5 to 10 year storage life. Assuming that such batteries will be recharged after a predetermined number of power cycles, they may be mounted in semipermanent fashion within a camera housing. A compartment 64 within housing 10 is arranged to receive the illustrated secondary battery unit 60. Bracket 66 disposed within the compartment is provided to retain the unit in fixed position. Of course, a wide selection of battery types and sizes will be found available for use as the secondary battery of the instant system.

Turning now to the primary battery of the power system, there is pictured in the drawing at 62 relatively flat, rectangular-shaped carbon-zinc or Leclanche-type dry cell. Battery 62 is shown fabricated as an assembly having a series of flat electrodes between which is an electrolyte separator. Referring to FIG. 2, the laminar cell 62 is pictured comprising a first layer or thin sheet of zinc 68 serving as an anode over which is deposited an electrolyte paste 70. A thin carbon layer 72 is positioned over the paste 70 to function as a cathode. Copper leads 74 and 76 are attached to serve respectively as contact members for the anode and cathode layers. A protective covering 78 formed of an insulative plastic such as Mylar or the like may be positioned over the outward surface of the cell 68. The entire assembly 68 may be adhesively bonded to the back plate 44 of cassette 36. Alternately, the first zinc layer 68 may be electrodeposited or the like upon plate 44 to provide the anode material. Those versed in the art at hand will flat that the capacity of the flat cell 62 may be varied by the simple expedient of adjusting the surface area and materials of the electrode layers 68 and 72. Further, the thicknesses of the electrode and electrolytic layers of the primary battery may vary to suit design needs. For instance, the entire laminar structure is readily fabricable in thicknesses of about 0.050 inches. Those skilled in the art will understand that a variety of techniques and systems are available for supplying power from a primary battery to the input terminals of secondary cell 60 and the accomplishment of this function by battery 62 in combination with cassette 42 has been illustrated by way of example. The particulars of this cassette and primary battery combination form no part of the present invention and are described and claimed in a copending application of Edwin H. Land, Ser. No. 752,989, filed Aug. 15, 1968, now abandoned and assigned to the assignee of the present application.

It is the function of the zinc-carbon battery 62 to recharge the secondary cell 60 and the function of the rechargeable secondary cell 60 is to power the energy consuming function of the camera. To serve the recharging function, only a simple circuitry is required. Returning to FIG. 1, a suitable parallel recharging circuitry readily incorporable within a conventional camera housing is schematically depicted. Upon insertion of the film pack or cassette 36 into the receiving chamber of housing 10, the terminals 74 and 76 of primary battery 62 will be in position for connection respectively in recharging relationship with storage unit 60 through spring loaded terminals 80 and 82. Inasmuch as the cassette 36 may be inserted within the receiving chamber in one orientation, a proper electrode-terminal relationship will always be obtained. Terminals 80 and 82 may be attached to the interior surface of the access door 48 such that as the latter is closed appropriate electrical contact will be realized. The positive poles of both primary battery 62 and secondary battery 60 are shown directed to ground. Current through cathode 74 is directed to the corresponding negative side of battery 60, however, a unidirectionally conductive diode 84 is inserted in its path.

Diode 84 serves to prevent the primary battery 62 from drawing off charge from secondary battery 60 as the former's charge deteriorates below the nominal charge of the latter. The recharging circuitry may be varied in correspondence with the particular storage cell units from which secondary battery 60 is fabricated. For instance, for some applications it may be found desirable to divide the recharging input and recharge the cells of unit 60 individually.

To derive a recharging relationship it is necessary that the nominal, open circuit voltage of the primary battery be at least slightly higher than that of the secondary. For example a singular standardized 1.56 zinc-carbon primary cell will adequately recharge a 1.24 nickel-cadmium secondary cell while accommodating a 0.20 v. differential at the diode 84. The form of charge provided by the present system is neither appropriately classed as a fast charge, nor a taper charge. The function of the primary cell is to bring the secondary cell to about nominal charge. The speed with which this is accomplished will vary in accordance with numerous preexisting factors. However, with the system, each function of the camera structure will be found to operate under a reliable power input substantially from the moment of insertion of the cassette 36 into the receiving chamber.

Additional leads 86 and 88 are present in the drawing for schematic illustrative purposes. Lead 86 depicts an electrical input to the electronic shutter circuitry from the output of secondary battery 60. Similarly, lead 88 is intended to depict an input into the illuminator unit 56 and motor assembly 58.

The secondary battery power supply may assume numerous configurations. For instance, it need not be flat, nor in permanent attachment to the film pack structure 36, however, the preference for such an arrangement is apparent. In the same light, it will be apparent that the recharging system may be incorporated within roll-film camera designs without difficulty.

The present system evolves a unique coordination between the physical and operational characteristics of conventional primary and secondary batteries. A long, attendance free service life is provided by a secondary cell in semipermanent attachment with the camera housing. A relatively high but short term current drain capacity of the secondary cell is maximized by virtue of its being utilized for only about 6 to 10 power cycles before being recharged. Recharging is reliably provided as an adjunct to the simple manual procedure of replenishing the film supply of a camera.

The primary cell of the system may be packaged and stored until use with each film container. Conventional photographic film is stored for only limited periods and at controlled relatively low temperature. These conditions ideally correspond with the storage requirements of a primary cell. The widely used primary cell is inexpensive to the extent that it may be discarded with a disposable film cassette. Further, its relatively short lifespan corresponds with the average term of use of a conventional film packet. When utilized in the flat configuration illustrated, the primary cell-film cassette combination is readily adapted to conventional camera structures.

Since certain changes may be made in the above system and apparatus without departing from the scope of the invention herein involved, it is intended that all matter contained in the above description or shown in the accompanying drawing shall be interpreted as illustrative and not in a limiting sense.

I claim:

1. A photographic camera configured to receive a film cassette incorporating a photosensitive film and a primary electrochemical battery comprising:
    a housing having a chamber for receiving said cassette;
    electrically powered means within said camera for performing an operation in connection with the exposure of said film;
    means for retaining within said housing a rechargeable secondary battery having an energy capacity sufficient to power said electrically powered means in connection with the exposure of said photosensitive film;

circuit means in said camera housing for linking said secondary battery with said electrically powered means; and terminal means disposed within said chamber for releasably connecting said primary battery with said secondary battery when said cassette is inserted in said chamber.

2. The photographic camera of claim 1 in which said terminal means includes means for interconnecting said primary battery with said secondary battery in recharging relationship.

3. The photographic camera of claim 1 in which said terminal means includes circuitry interconnecting said primary and secondary batteries in a parallel recharging relationship.

4. The photographic camera of claim 1 in which said terminal means includes means for interconnecting said primary and secondary batteries in parallel recharging relationship; and said interconnecting means includes a unidirectionally conductive element for preventing a backdrain of current from said secondary battery into said primary battery.

5. The photographic camera of claim 1 in which said terminal means includes circuitry interconnecting said primary and secondary batteries in parallel recharging relationship; and said interconnecting circuitry includes a diode adapted to prevent the backdrain of current from said secondary battery into said primary battery.

6. The photographic camera of claim 1 in which said terminal means includes spring loaded contacts for releasably interconnecting said primary and secondary batteries in parallel recharging relationship.

7. The photographic camera of claim 1 in which said electrically powered means comprises a mechanism for transporting said film.

8. The photographic camera of claim 1 in which electrically powered means comprises an electrically controlled shutter.

9. The photographic camera of claim 1 in which said electrically powered means includes at least one photographic flash apparatus.

10. The photographic camera of claim 1 in which said electrically powered means includes an electrical discharge illuminating device.

11. Apparatus for exposing photosensitive film comprising:
a photographic camera including:
electrically powered means within said camera for performing an operation on connection with exposure of said film,
a housing having a receiving chamber for retaining a quantity of said film in position for the said exposure,
means for retaining within said housing a rechargeable secondary battery having an energy capacity sufficient to power said electrically powered means in connection with the exposure of said film;
a cassette for retaining said film, adapted for removable insertion within said receiving chamber;
a primary electrochemical battery disposed in association with said cassette; and
terminal means disposed within said chamber for releasably connecting said primary battery with said secondary battery when said cassette is inserted in said chamber.

12. The apparatus of claim 11 in which said primary electrochemical battery is connected to said cassette in a mutually storable relationship.

13. The apparatus of claim 11 wherein said secondary battery has an electrical capacity when charged to nominal voltage sufficient to power said electrically powered means throughout the exposure of said quantity of film.

14. The apparatus of claim 11 in which said terminal means includes circuit means interconnecting said primary and secondary batteries in recharging relationship.

15. The apparatus of claim 11 in which said terminal means includes circuit means interconnecting said primary and secondary batteries in recharging relationship; and said primary battery is selected having a nominal voltage sufficient to charge said secondary battery to its nominal voltage.

16. The apparatus of claim 11 in which said terminal means includes circuit means interconnecting said primary and secondary batteries in recharging relationship; and said circuit means includes a unidirectionally conductive element for preventing a backdrain of energy from said secondary battery.

17. The apparatus of claim 11 in which said terminal means includes circuit means interconnecting said primary and secondary batteries in parallel recharging relationship; and said interconnecting circuitry includes a diode adapted to prevent the backdrain of current from said secondary battery to said primary battery.

18. The apparatus of claim 11 in which said terminal means includes circuit means interconnecting said primary and secondary batteries in recharging relationship; and said interconnecting means includes spring loaded contacts for releasably interconnecting said primary and secondary batteries.

19. A photographic camera configured to receive a quantity of photosensitive film and a primary electrochemical battery comprising:
housing means for receiving said photosensitive film and said primary electrochemical battery;
electrically powered means within said camera for performing an operation in connection with the exposure of said film;
means for retaining within said housing a rechargeable secondary battery having an energy capacity sufficient to power said electrically powered means in connection with the exposure of said photosensitive film;
circuit means in said camera housing for linking said secondary battery with said electrically powered means; and
terminal means disposed within said housing means for releasably connecting said primary battery in charging relationship with said secondary battery.

20. Apparatus for exposing photosensitive material comprising:
a photographic camera including:
electrically powered means within said camera for performing an operation in connection with exposure of said photosensitive material,
housing means for retaining a quantity of said photosensitive material in position for the said exposure,
means for retaining within said housing means a releasable secondary battery having an energy capacity sufficient to power said electrically powered means in connection with the exposure of said photosensitive material,
means for releasably retaining within said housing a primary electrochemical battery,
a cassette for retaining said photosensitive material adapted for removable insertion within said housing means; and
terminal means disposed within said housing means for releasably connecting said primary battery with said secondary battery.